United States Patent [19]

Campbell

[11] Patent Number: 4,570,457
[45] Date of Patent: Feb. 18, 1986

[54] CRYOGENIC COOLING APPARATUS

[75] Inventor: David N. Campbell, Warwickshire, England

[73] Assignee: The Hymatic Engineering Company Limited, Redditch, England

[21] Appl. No.: 689,372

[22] Filed: Jan. 7, 1985

[30] Foreign Application Priority Data

Jan. 26, 1984 [GB] United Kingdom ............... 8402060

[51] Int. Cl.⁴ .............................................. F25B 19/00
[52] U.S. Cl. .................................. 62/514 JT; 62/223
[58] Field of Search .................... 62/222, 223, 514 JT

[56] References Cited

U.S. PATENT DOCUMENTS 3,257,823  6/1966  Hogan ........................... 62/514 JT
3,517,525  6/1970  Campbell ...................... 62/514 JT
3,827,252  8/1974  Chovet et al. ................. 62/514 JT

FOREIGN PATENT DOCUMENTS 1311003  3/1973  United Kingdom ............ 62/514 JT
1368107  9/1974  United Kingdom ............ 62/514 JT Primary Examiner—Ronald C. Capossela
Attorney, Agent, or Firm—Cushman, Darby & Cushman

[57] ABSTRACT

Cryogenic cooling apparatus includes a tubular heat exchanger comprising a gas supply pipe wound around a former within a Dewar vessel. In use pressurized refrigerant gas is supplied through the pipe to a Joule-Thomson expansion nozzle to liquefy a portion of the gas in the Dewar vessel and low pressure gas then returns between the former and the Dewar vessel. A valve member cooperates with the nozzle to vary its area for automatically varying the flow of the refrigerant gas. The nozzle is fixed and the valve member is movable and connected to a first guide member which affords a first guide surface cooperating with a fixed second guide surface. One of the guide surfaces is tapered in the direction of relative movement of the nozzle and valve member whereby when the valve member and the nozzle are in the relatively open position the two guide surfaces are in contact and as the valve member and the nozzle progressively move into the relatively closed position the guide surface become progressively spaced apart.

13 Claims, 3 Drawing Figures

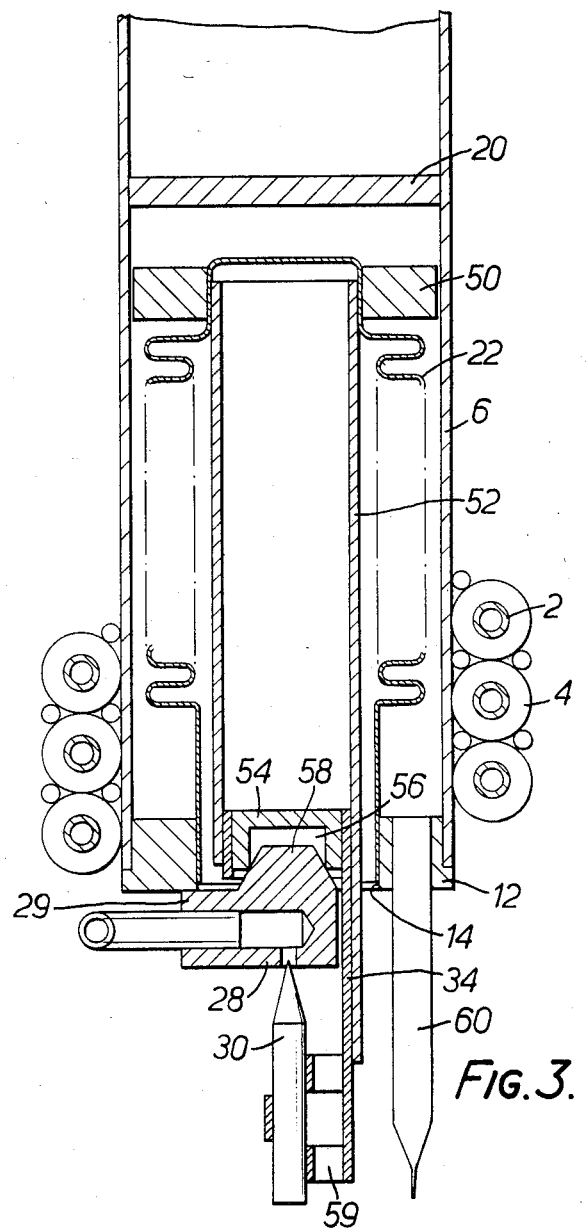

CRYOGENIC COOLING APPARATUS

This invention relates to cryogenic cooling apparatus for use in cooling a load, such as the active element of an infrared detecting device, and is concerned with that type of apparatus which includes a generally tubular heat exchanger affording two paths, through one of which, in use, refrigerant gas from a supply under pressure is supplied to a Joule-Thomson expansion nozzle to liquefy a portion of the gas in a container, whence the low pressure gas returns through the other path, and a valve member co-operating with the nozzle to vary its effective area for automatically controlling the flow of the refrigerant.

Unlike ordinary thermostatic cooling apparatus, apparatus of the type referred to, in which gaseous refrigerant is liquefied, cannot be controlled by the temperature of the refrigerant since this remains constant so long as refrigerant liquid is in equilibrium with refrigerant vapour at constant pressure. Thus the aim is to control the cooling in accordance with the amount of refrigerant liquid present in the container, either in a pool or in the form of a spray of droplets. Such cbntrol is made possible by the fact that liquid refrigerant extracts heat from an object with which it is in contact at a greater rate than does gaseous refrigerant at the same temperature.

The valve member and the nozzle are generally moved relative to one another by a movable wall, e.g. of a bellows, which is connected to one of them and which is situated within or beyond the heat exchanger and is exposed on one side to the pressure of a sensing vapour which, in operation, is in equilibrium with liquid. Heat is extracted from the sensing vapour at a rate dependent on the amount of liquid refrigerant present either by a sensor bulb whose interior communicates with the sensor vapour volume or by a thermally conductive member which extends down to the region of or beyond the nozzle. It is also known to effect relative movement of the nozzle and the valve member by means of an expander member which is subjected to liquid refrigerant and whose changes in length due to changes in temperature are translated into opening or closing movement of the valve.

Cooling apparatus of the type referred to is frequently installed in an environment where it is subjected to extreme conditions of shock and vibration which can easily damage it, in particular the valve member or seat which control the flow of refrigerant gas. In practice, such apparatus is only actually used for a small proportion of its service life and thus most of the shock and vibration takes place when the apparatus is not in use, that is to say when the refrigerant gas valve is fully open. It will be appreciated that, particularly when the valve is a needle valve, the valve member and valve seat mutually stabilise one another and thus substantially prevent relative movement when the valve is fully or largely closed but that relative movement is increasingly possible as the valve progressively opens. Furthermore, the relatively high refrigerant gas flow rates and pressures which are commonly used in such cooling apparatus produce dynamic forces on the valve member which may result in flow-induced vibration of the latter.

Vibration of the valve member against the valve seat may result in permanent deformation of one or the other which will result in turn in an inability of the valve accurately to control the gas flow. The nozzle of such valves may have a diameter of only 0.1 mm and it is difficult to restrain vibration since the required operating concentricity may be as little as 0.01 mm and any such restraint must permit perfect seating of the valve when it is closed and allow a free flow of refrigerant gas leaving the nozzle.

It is an object of the present invention to provide a cooling apparatus of the type referred to in which the valve member is restrained against vibration when in the open position and in which perfect seating and free flow of the gas may nevertheless be achieved.

According to the present invention cryogenic cooling apparatus includes a generally tubular heat exchanger affording two paths, through one of which, in use, refrigerant gas from a supply under pressure is supplied to a Joule-Thomson expansion nozzle to liquefy a portion of the gas in a container whence the low pressure gas returns through the other path, and a valve member cooperating with the nozzle to vary its effective area for automatically varying the flow of the refrigerant gas, either the nozzle or the valve member being fixed and the other being movable and connected to a first guide member which affords a first guide surface cooperating with a fixed second guide surface, at least one of the said guide surfaces being tapered in the direction of relative movement of the nozzle and the valve member, whereby when the valve member and the nozzle are in the relatively open position the two guide surfaces are in contact and as the valve member and the nozzle progressively move into the relatively closed position the guide surfaces become progressively spaced apart.

Thus in the apparatus in accordance with the present invention the movable one of the nozzle and valve member is connected to a guide member which contacts a further guide member when the valve is in the open position. In the preferred form of the invention the nozzle is fixed and the valve member is movable and it is preferred that the valve member is a needle, that is to say that the valve is a needle valve. The valve member is thus restrained against vibration when the valve is open and as the valve is progressively closed the two guide surfaces progressively move apart by virtue of the fact that one of the guide surfaces is tapered. This results in a reduction in the restraint afforded by the two guide surfaces so that control of sideways movement is progressively transferred from the guide surfaces to the valve surfaces thus allowing self-centering of the valve when closed.

The movable one of the nozzle and the valve member, which is preferably the valve member, is moved automatically to control the flow of refrigerant gas in dependence on the amount of liquid refrigerant being produced and/or the amount of liquid refrigerant present in the container. This control may be effected by any known conventional means, e.g. utilising an expander member whose length varies in dependence on the amount of liquid refrigerant, but it is preferred that a bellows within the heat exchanger is used which is exposed on one side to the pressure of the sensing gas.

Preferably the two guide surfaces are situated adjacent that end of the bellows, referred to as the cold end, which is closest to the nozzle. It will be appreciated that this results in the lateral guiding effect of the two guide surfaces being located where it is required, that is to say in the region of the nozzle and the guide member.

In one embodiment of the invention the end of the bellows remote from the nozzle is fixed whilst the cold end carries the first guide member. In this event the first guide surface may be tapered and the first guide member may extend through a fixed aperture, whose edge constitutes the second guide surface, and carry the valve member.

In a preferred embodiment of the invention the movable one of the nozzle and the valve member is connected to move with a third guide surface which is more remote from the nozzle than the first guide surface and which cooperates with a fourth guide surface to restrain movement of the third guide surface transverse to the direction of relative movement of the nozzle and valve member. In this construction the movable one of the nozzle and the valve member, or a member connected to it, is restrained against lateral movement such as vibrational movement at two positions spaced apart in the direction of the length of the heat exchanger and it will be appreciated that this produces a more positive and reliable vibrational restraint. One such construction includes a third guide member connected to the first guide member and extending within the bellows, the end of the third guide member remote from the nozzle having a tapered external surface which constitutes a third guide surface and which extends into a fixed aperture whose edge constitutes the fourth guide surface.

The interior of the bellows may contain the sensing gas or alternatively the interior of the bellows may communicate with the interior of the container in which event the end of the bellows closest to the nozzle may be fixed and the bellows surrounded by the sensing gas. In the latter event the apparatus may include an elongate member extending within the bellows and connected to the end of the bellows remote from the nozzle, the elongate member carrying the first guide surface at its end closest to the nozzle. The second guide surface may be tapered in the direction of relative movement of the nozzle and the valve member and extend into an aperture which moves with the elongate member and whose edge constitutes the first guide surface. One embodiment of the present invention includes a third guide member connected to move with that end of the bellows which is remote from the nozzle, the third guide member affording the third guide surface, the heat exchanger including a tubular former whose inner surface constitutes the fourth guide surface.

Further features and details of the present invention will be apparent from the following description of two specific embodiments which is given by way of example with reference to the accompanying drawings in which:

FIG. 3 is a view similar to FIG. 1 of a modified embodiment, from which the Dewar vessel has been omitted for the sake of simplicity.

Figure 1:
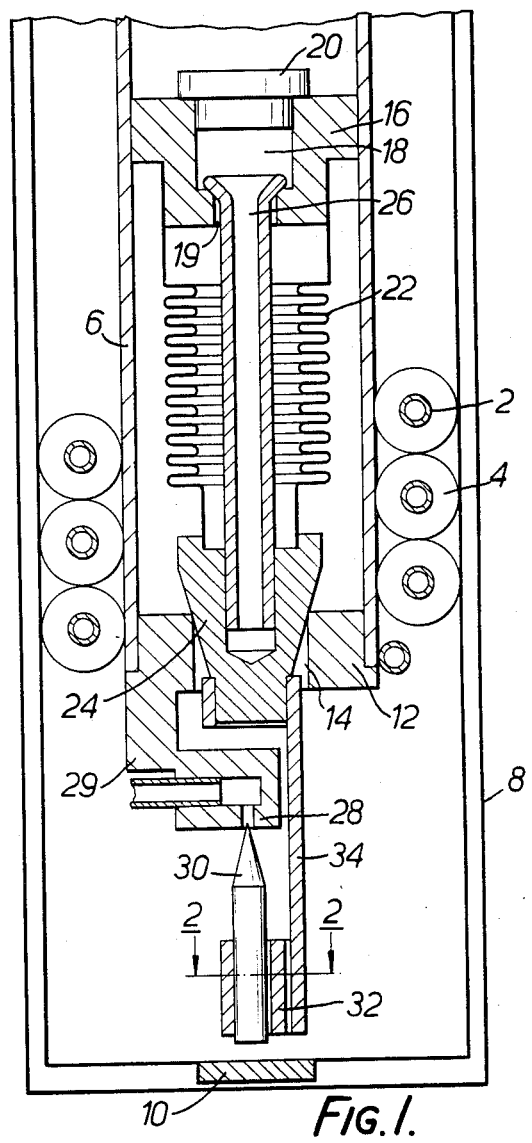
FIG. 1 is a diagrammatic vertical section through a first embodiment of cryogenic cooling apparatus.
Figure 2:
FIG. 2 is a scrap sectional plan view on the line 2—2 in FIG. 1.

Referring firstly to FIGS. 1 and 2, a tubular heat exchanger comprising a gas supply tube 2 which is provided with spaced fins 4 and is spirally wound around a hollow metal former 6 is accommodated within a Dewar vessel 8 within the bottom wall of which is a thermal load 10 to be cooled. The lower end, which will be referred to as the cold end, of the former 6 is closed by an annular support 12 in which a parallel sided central aperture 14 is formed whilst somewhat higher up the interior of the former 6 is closed by a thermally conductive support 16 which is substantially T-shaped in cross section and which is formed with a central aperture 18 which is closed at the top by a plug 20 and which has a portion 19 of restricted cross section at the bottom.

Situated between the two supports is a metallic bellows 22 whose upper end is secured to the depending portion of the support 16 and whose lower end is connected to a guide member 24 which has a downwardly convergent conical outer surface extending into and, in the position illustrated, contacting the surface of the aperture 14 in the support 12. Extending vertically within the bellows is a hollow further guide member 26 whose lower end is rigidly connected to the guide member 24 and whose upper end has a downwardly convergent outer surface within the reduced section aperture 19 engaging the internal surface thereof.

The gas supply tube 2 communicates with a fixed valve seat 28 which is formed in an integral depending portion 29 of the support 12 and which cooperates with a valve needle 30. The valve needle is held in a channel formed by bending the lower end 32 of a thermally conductive needle holder 34 in the manner best seen in FIG. 2. The upper end of the needle holder 34 is connected to the lower end of the guide member 24 which projects through the aperture 14 in the support 12.

Before use, the interior of the bellows is charged with a pressurised sensing gas which is normally the same as the refrigerant gas and which is retained in the bellows by the plug 20.

In use, gas such as argon or nitrogen and at a temperature less than its inversion temperature is permitted to flow from a pressurised supply through the tube 2 which constitutes the first flow path of the heat exchanger and then through the valve nozzle defined by the seat 28. As the gas flows through the nozzle it cools down by virtue of the Joule-Thomson effect and it then flows back through the second pathway of the heat exchanger defined by the former 6 and Dewar vessel 8 around the finned tube 2 thereby cooling the inflowing gas. As operation proceeds the gas exiting through the nozzle progressively cools as do the thermal load 10 and the entire apparatus until the gas reaches liquefaction temperature whereafter the exiting gas contains droplets of liquefied refrigerant which impinge against the needle holder 34 and the base of the Dewar vessel adjacent the thermal load.

As cooling progresses the needle holder 34 cools down and this temperature is transmitted to the sensing gas through the guide member 24. As the needle holder is contacted by drops of liquid refrigerant the rate of heat extraction from the needle holder and thus from the sensing gas increases considerably thereby producing a partial liquefaction of the sensing gas and/or a substantial reduction of pressure within the bellows which in turn results in the bellows moving upwardly to move the valve needle into the nozzle and thus to throttle the gas flow through the nozzle. The rate of liquid refrigerant droplet production and thus the rate of heat extraction from the sensing vapour are thus reduced and an equilibrium is reached in which a throttled flow of gas through the nozzle is permitted to continue at a rate determined by the total heat load to which the apparatus is subjected.

FIG. 1 shows the valve in the fully open position in which the conical guide surfaces of the guide members 24 and 26 engage the corresponding guide surfaces of the apertures 14 and 19. By virtue of this contact at two regions spaced apart in the direction of the length of the heat exchanger the valve holder and thus the valve needle are effectively restrained against all vibration. As the valve begins to close a small clearance is produced between the pairs of guide surfaces and thus their guiding or restraining ability is reduced but at the same time the tip of the valve needle progressively enters the nozzle which of itself restrains the valve needle against excessive vibration. The valve needle is thus fully restrained against vibration when in the open position, that is to say when it is in the position in which it is most susceptible to damage, and is subject to a reducing but nevertheless adequate degree of restraint as the valve progressively closes and becomes decreasingly susceptible to damage. It will be appreciated that in both pairs of cooperating guide surfaces, either or both of the guide surfaces may be tapered.

FIG. 3 is a view similar to FIG. 1 of a modified construction which is somewhat simpler to manufacture but in which the restraint of the valve needle is effected using only one conical guide surface. As before, the heat exchanger comprises a finned tube around a former which contains a bellows and a valve needle 30 cooperates with a fixed valve seat 28 formed in a member 29 integral with or connected to a support 12 closing the cold end of the former. The cold end of the bellows is, however, fixed by being secured within the aperture 14 in the support 12 and the warm or upper end of the bellows is connected within an aperture within a guide disc 50 which is a close sliding fit within the former 6. The former is seated above the bellows by a plug 20 whilst the bellows contains a tube 52 which is connected to the top of the bellows and whose lower end is closed by a plug 54 defining an open bottomed cylindrical recess 56. The fixed member 29 carries an integral upwardly convergent frusto-conical projection 58 which extends into the recess 56. The needle holder 34 is connected to the base 52 and the plug 54 and at its lower end has three fingers 59, each of which is bent to define a channel accommodating the stem of the needle 40 so that the valve needle moves with the upper end of the bellows and with the plug 54.

As may be seen, the interior of the bellows communicates with the interior space of the Dewar vessel into which the gas is discharged through the nozzle and the space within the former between the support 12 and plug 20 outside the bellows 22 is charged with the sensing gas and communicates with the space within a closed ended sensor tube 60 which extends down beyond the valve nozzle.

In use, heat is extracted from the sensing gas via the sensor tube in dependence on the rate of production of refrigerant droplets and/or the amount of liquid refrigerant in the Dewar vessel and this leads to a decrease in the pressure of the sensing gas and thus an expansion of the bellows which is translated into an upward movement of the upper end of the bellows and the valve needle.

In the fully open position of the valve shown in FIG. 3, the valve needle is restrained against vibration by the engagement of the conical guide surface of the projection 58 with the edge of the aperture 56 and by the sliding engagement of the guide disc 50 with the inner surface of the former. As the valve progressively opens the restraint of the valve needle reduces somewhat as a gap opens between the guide surface 58 of the projection 29 and the edge of the aperture 56 though the restraint at the upper end of the bellows remains constant by virtue of the fact that the cooperating surfaces of the guide disc 50 and the inner surface of the former extend and move parallel to one another.

Obviously, numerous modifications and variations of the present invention are possible in the light of the above teachings. It is therefore to be understood that within the scope of the appended claims, the invention may be practiced otherwise than as specifically described herein.

What is claimed as new and desired to be secured by Letters Patent of the United States is:

1. Cryogenic cooling apparatus adapted to be connected to a pressurised supply of refrigerant gas, said apparatus including a generally tubular heat exchanger, a container, an expansion nozzle within said container and a valve member cooperating with said nozzle to vary its effective area for automatically varying the flow of said refrigerant gas, said heat exchanger affording two paths through one of which refrigerant gas flows, in use, to said expansion nozzle to liquefy a portion of said gas in said container whereafter the gas returns through the other said path, one of said nozzle and said valve member being fixed and the other being movable and connected to a first guide member, said first guide member affording a first guide surface and cooperating with a fixed second guide surface, at least one of said first and second guide surfaces being tapered in the direction of relative movement of said nozzle and said valve member, whereby when said valve member and said nozzle are in the relatively open position and guide surfaces are in contact, and thus substantially prevent relative lateral movement of said valve member and said nozzle, and as said valve member and said nozzle progressively move into the relatively closed position said guide surfaces become progressively spaced apart.

2. Apparatus as claimed in claim 1 wherein said nozzle is fixed and said valve member is movable.

3. Apparatus as claimed in claim 1 including a bellows connected to the movable one of said nozzle and said valve member, said bellows being disposed within said heat exchanger and being exposed on one side to the pressure of a sensing gas.

4. Apparatus as claimed in claim 3 wherein said bellows has two ends and said first and second guide surfaces are situated adjacent that end of said bellows, referred to as the cold end, which is closest to said nozzle.

5. Apparatus as claimed in claim 4 wherein that end of said bellows which is remote from said nozzle is fixed whilst said cold end carries said first guide member.

6. Apparatus as claimed in claim 5 wherein said nozzle is fixed and said valve member is movable and wherein said first guide surface is tapered and said first guide member extends through a fixed aperture and carries said valve member, the edge of said aperture constituting said second guide surface.

7. Apparatus as claimed in claim 3 wherein the interior of said bellows contains said sensing gas.

8. Apparatus as claimed in claim 3 wherein the end of said bellows closest to said nozzle is fixed and said bellows is surrounded by said sensing gas.

9. Apparatus as claimed in claim 8 including an elongate member extending within said bellows and connected to the end of said bellows remote from said nozzle, said elongate member carrying said first guide surface at its end closest to the nozzle.

10. Apparatus as claimed in claim 9 wherein said second guide surface is tapered in the direction of relative movement of said nozzle and said valve member and extends into an aperture which moves with said elongate member, the edge of said aperture constituting said first guide surface.

11. Apparatus as claimed in claim 8 including a third guide surface connected to move with the movable one of said nozzle and said valve member, said third guide surface being more remote from said nozzle than said first guide surface and cooperating with a fourth guide surface to restrain movement of said third guide surface transverse to the direction of relative movement of said nozzle and said valve member, and including a third guide member connected to move with that end of said bellows which is remote from said nozzle, said third guide member affording said third guide surface, the heat exchanger including a tubular former having an inner surface, said inner surface constituting said fourth guide surface.

12. Apparatus as claimed in claim 1 including a third guide surface connected to move with the movable one of said nozzle and said valve member, said third guide surface being more remote from said nozzle than said first guide surface and cooperating with a fourth guide surface to restrain movement of said third guide surface transverse to the direction of relative movement of said nozzle and said valve member.

13. Apparatus as claimed in claim 12 wherein said nozzle is fixed and said valve member is movable and wherein said first guide surface is tapered and said first guide member extends through a fixed aperture and carries said valve member, the edge of said aperture constituting said second guide surface and further including an elongate third guide member connected to said first guide member and extending within said bellows, the end of said third guide member remote from said nozzle having a tapered external surface constituting said third guide surface and extending into a fixed aperture, the edge of said fixed aperture constituting said fourth guide surface.

* * * * *